Oct. 4, 1927.  
A. G. HALL  
1,644,429  
REEL LOCK FOR FISH RODS  
Filed Oct. 22, 1925
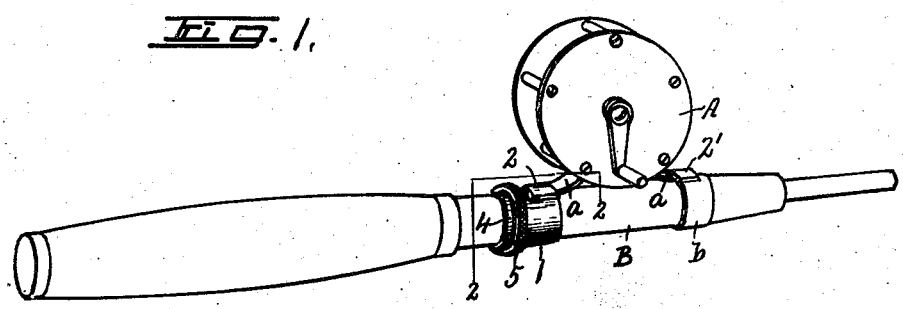
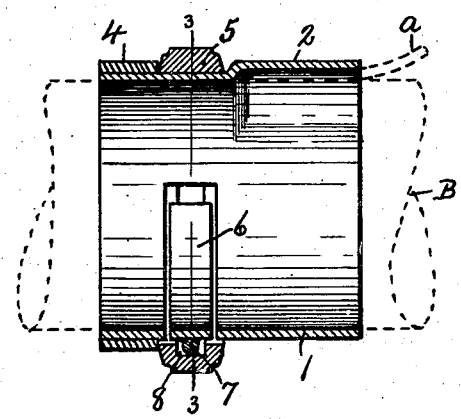
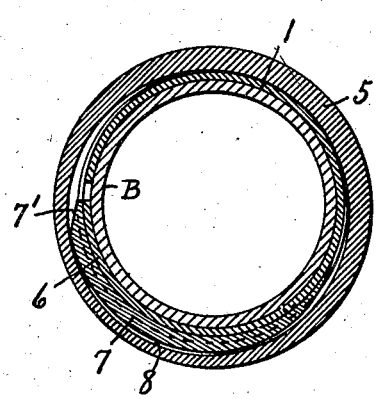
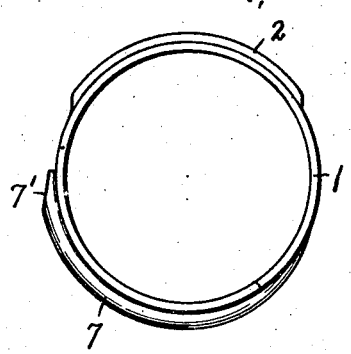
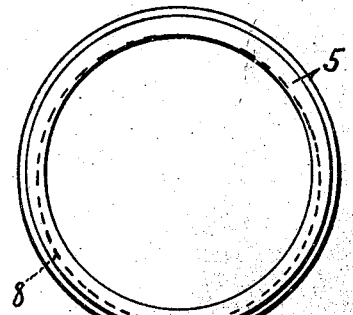
INVENTOR  
A. G. Hall  
BY Denison & Thompson  
ATTORNEYS
WITNESS Patented Oct. 4, 1927.

1,644,429

UNITED STATES PATENT OFFICE.

ALEXANDER G. HALL, OF HIGHLAND MILLS, NEW YORK.

REEL LOCK FOR FISH RODS.

Application filed October 22, 1925. Serial No. 64,177.

This invention relates to a reel lock for fish rods but may be used for many other purposes where it may be necessary or desirable to lock and release a ferrule or sleeve upon and from a cylindrical object so as to hold those parts in fixed relation or permit their relative movement when required.

In the use of reels or fish rods the frame of the reel is usually provided with suitable feet or arms projecting in opposite directions therefrom and adapted to be applied to the periphery of the rod lengthwise thereof to be engaged by ferrules or sleeves, one or both of which may be movable lengthwise of and upon said rod into and out of locking engagement with said feet.

The main object of the present invention is to provide one or both of these ferrules or sleeves with relatively rotatable means for compressing and releasing a portion of the ferrule upon and from the periphery of the rod for locking and releasing the reel in and from its operative positions.

In other words, I have sought to provide a more practicable and expeditious means for frictionally tightening and releasing a sleeve or ferrule upon and from a rod or tube extending therethrough by the simple hand rotation of a ring upon the sleeve or ferrule in one direction or the other.

Other objects and uses relating to specific parts of the locking device will be brought out in the following description.

In the drawings:—

Figure 1 is a perspective view of a portion of a fish rod with a reel thereon held in operative position by my improved locking device.

Figure 2 is an enlarged longitudinal sectional view of the detached locking device showing by dotted lines the adjacent portions of the rod and one of the feet of the reel taken on line 2—2, Figure 1.

Figure 3 is a transverse sectional view of the same locking device taken in the plane of line 3—3, Figure 2.

Figures 4 and 5 are end views of the detached sleeve and locking ring respectively.

When the locking device is to be used for locking a reel as —A— to a fish rod as —B— it comprises a tubular sleeve or ferrule —1— of suitable metal having one end provided with a raised boss —2— struck up from one side thereof for receiving one of the feet as —a— of the reel —A—, the other foot being engaged with a similar raised boss —2—' of an opposed co-axial sleeve as —b— which may be permanently secured to the periphery of the rod —B— in spaced relation to the locking sleeve —1—.

The raised boss —2— is preferably concentric with the axis of the ferrule —1— and extends inwardly from one end approximately half the length of said ferrule but the circumferential length is only a fractional part of the circumference or approximately equal to the width of one of the feet —a— of the reel which it is adapted to receive.

The remaining portion of the length of the sleeve or ferrule —1— is cylindrical and its outer end is provided with a reinforcing band —4— in spaced relation to the inner end of the boss —2—.

A ring —5— is rotatably mounted upon the cylindrical portion of the sleeve or ferrule —1— between the ring —4— and boss —2— which form suitable stops for limiting the axial movement of the ring and preventing its endwise displacement from the sleeve, the band —4— being brazed or otherwise secured to the adjacent end of the sleeve to form a substantially unitary part thereof.

A portion of the sleeve or ferrule —1— registering with and inclosed by ring —5— is cut to form a circumferentially extending tongue —6— having one end integrally united thereto and its other end free to move inwardly and outwardly against and away from the periphery of the adjacent portion of the rod —B—, said tongue being provided with a circumferentially extending cam —7— which preferably consists of a piece of wire or other equivalent material brazed or otherwise secured to the periphery of the tongue and gradually tapered from the free end of the tongue circumferentially practically the entire length thereof so that it is reduced and gradually merges with the periphery of the tongue as shown more clearly in Figures 3 and 4.

The end of the cam —7— nearest the free end of the tongue —6— is beveled at —7'— to permit it to ride more freely against the inner face of the ring —5—.

This ring is provided with an internal cam groove —8— for receiving the cam —7—, the outer walls of the groove being eccentric to the axis of the sleeve —1— while its periphery is concentric with said axis so that by rotating the ring —5— in one direction or the other the outer wall of the cam groove will engage the periphery of the cam —7— for pressing the tongue inwardly against the periphery of the rod —B— for frictionally clamping the sleeve or ferrule —1— to said rod and thereby locking the reel in operative position.

Reversing the direction of rotation of the ring —5— will release the pressure upon the cam —7— thereby allowing the tongue —6— to spring outwardly under its own tension for releasing the sleeve or ferrule —1— and permitting it to be moved axially out of interlocking engagement with the adjacent foot of the reel which may then be removed from the opposite boss —2'—.

The ring —5— extends radially beyond the boss —2— and band —4— and is provided with a knurled periphery adapted to be engaged by the hand for turning the same in the act of tightening and releasing the sleeve or ferrule —1— upon and from the rod.

The ring —5— also extends axially beyond the opposite sides of the tongue —6— thereby concealing and protecting the tongue and cams against contact with external objects.

The cam groove —8— extends circumferentially approximately or slightly greater than one half the circumference of the interior of the ring —5— while the tongue —6— and its cam —7— extends circumferentially a slightly less distance than the length of the groove and is preferably arranged diametrically opposite the boss —2— so that when it is pressed inwardly against the periphery of the rod —B— by the rotation of the ring —5— it will tend to draw the outer wall of the boss —2— against the adjacent foot —a— of the reel to firmly hold the latter in operative position upon the rod against circumferential or endwise movement.

It is, of course, evident that instead of rotating the ring —5— in reverse directions for locking and unlocking the sleeve upon and from the rod it may be moved continuously in one direction for the same purpose, and, therefore, I do not wish to limit the invention to a reverse motion ring nor to the other details of construction herein shown and described.

I claim:

1. In a reel lock for fish rods, a sleeve having a raised boss on one end for receiving a portion of a reel and provided with a circumferentially elongated opening, a tongue fastened to the sleeve at one end of the opening and its other end movable radially in said opening, and a ring rotatably mounted on the sleeve to cover the opening and tongue, and provided with means for pressing the free end of the tongue inwardly and for releasing the pressure on said tongue as the ring is rotated in reverse directions.

2. A reel lock for fish rods comprising a sleeve having an annular peripheral shoulder on one end and a raised boss on its other end to receive a portion of a reel, the portion of the sleeve between the shoulder and boss having a circumferentially elongated opening, a tongue fastened to the sleeve at one end of the opening and having its other end movable radially in said opening, and a ring rotatably mounted on the sleeve between the shoulder and boss and provided with means for pressing the tongue inwardly when rotated in one direction.

In witness whereof I have hereunto set my hand this sixteenth day of October, 1925.

ALEXANDER G. HALL.